(12) United States Patent
Pyun

(10) Patent No.: US 8,857,896 B2
(45) Date of Patent: Oct. 14, 2014

(54) STRUCTURE FOR DISPERSING COLLISION ENERGY OF FRONT PILLAR DURING CAR CRASH

(71) Applicant: Hyundai Motor Company, Seoul (KR)

(72) Inventor: Sungdon Pyun, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/706,069

(22) Filed: Dec. 5, 2012

(65) Prior Publication Data
US 2014/0054926 A1 Feb. 27, 2014

(30) Foreign Application Priority Data
Aug. 21, 2012 (KR) .................. 10-2012-0091206

(51) Int. Cl.
B62D 25/04 (2006.01)
B62D 25/08 (2006.01)

(52) U.S. Cl.
CPC ............. B62D 25/04 (2013.01); B62D 25/082 (2013.01)
USPC .................. 296/187.09; 296/193.06; 296/209

(58) Field of Classification Search
USPC .................. 296/187.09, 209, 193.06, 203.02, 296/203.03, 30
See application file for complete search history.

(56) References Cited

U.S. PATENT DOCUMENTS

| 5,653,495 A * | 8/1997 | Bovellan et al. ......... 296/203.03 |
| 6,250,710 B1 * | 6/2001 | Matsuzaki ............... 296/203.02 |
| 6,299,237 B1 * | 10/2001 | Benz et al. ............... 296/187.09 |
| 6,447,052 B2 * | 9/2002 | Saeki ....................... 296/187.09 |
| 6,450,565 B2 * | 9/2002 | Yamamoto ............... 296/187.09 |
| 6,607,239 B1 * | 8/2003 | Fuji ......................... 296/203.03 |
| 6,644,725 B2 * | 11/2003 | Braitmaier et al. ...... 296/203.03 |
| 7,614,658 B2 * | 11/2009 | Yamada ....................... 280/784 |
| 7,731,272 B2 * | 6/2010 | Moore et al. ............. 296/187.09 |
| 8,201,872 B2 * | 6/2012 | Baccouche et al. ...... 296/187.09 |
| 2001/0013711 A1 * | 8/2001 | Motozawa et al. .......... 296/68.1 |

FOREIGN PATENT DOCUMENTS

| JP | 08207579 A | * | 8/1996 |
| JP | 2001-253365 A | | 9/2001 |
| JP | 2003127898 A | | 5/2003 |
| JP | 2006-151103 A | | 6/2006 |
| KR | 10-0412892 B1 | | 12/2003 |
| KR | 10-0422558 B1 | | 3/2004 |
| KR | 20120007230 A | | 1/2012 |

* cited by examiner

*Primary Examiner* — Pinel Romain
(74) *Attorney, Agent, or Firm* — Morgan, Lewis & Bockius LLP

(57) ABSTRACT

A structure for dispersing the collision energy of a front pillar during a car crash, may include a front impact absorption member formed in the interior of a front frame of a vehicle and configured to receive a collision energy when a car crashes into on its front side; upper and lower impact absorption members configured to disperse the collision energy of the front impact absorption member to a front pillar and a lower side of the front pillar; and an impact transition member connected to a lower side of the lower impact absorption member and connected to a front end portion of the side sill.

5 Claims, 9 Drawing Sheets

STRUCTURE FOR DISPERSING COLLISION ENERGY OF FRONT PILLAR DURING CAR CRASH

CROSS-REFERENCE(S) TO RELATED APPLICATIONS

The present application claims priority of Korean Patent Application Number 10-2012-0091206 filed Aug. 21, 2012, the entire contents of which application is incorporated herein for all purposes by this reference.

BACKGROUND OF INVENTION

1. Field of Invention

The present invention relates to a structure for dispersing the collision energy of a front pillar during a car crash, and in particular to a structure for dispersing the collision energy of a front pillar during a car crash which makes it possible to minimize the hurts of a driver and a passenger in such a way to effectively disperse a collision energy transferred to a front pillar when a car crashes into on its front side.

2. Description of Related Art

When an impact is transferred to a front side of a vehicle, the impact is directly transferred to the side of a driver if a front pillar and a crash pad don't effectively absorb the impacts.

In particular, the collision energy is directly transferred to a fender apron without passing through a front side member which is an impact absorption structure and to the lower side of a front pillar, so the crash pad is pushed back a lot, thus causing an opening part of a door to deform. When the opening part of the door deforms a lot, the upper sides of a side sill and a front pillar might be bent, so a driver and a passenger could be severely hurt.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention is made to resolve the problems encountered in the conventional art. Various aspects of the present invention provide for a structure for dispersing the collision energy of a front pillar during a car crash which makes it possible to minimize a collision energy which is directly transferred to a front pillar of a vehicle.

Various aspects of the present invention provide for a structure for dispersing the collision energy of a front pillar during a car crash, comprising a front impact absorption member formed in the interior of a front frame of a vehicle and configured to receive a collision energy when a car crashes into on its front side; upper and lower impact absorption members configured to disperse the collision energy of the front impact absorption member to a front pillar and a lower side of the front pillar; and an impact transition member connected to a lower side of the lower impact absorption member and connected to a front end portion of the side sill.

In addition, the front impact absorption member and the lower impact absorption member respectively have a bent surface of which both sides are bent about one surface and are engaged in such a way that any one of the pairs of the bent surfaces of the front impact absorption member and the lower impact absorption member surface-contacts.

In addition, the front impact absorption member is formed in a trapezoid shape of which the height gradually increases in the direction from the front end portion to the rear end portion.

One end portion of the upper impact absorption member is connected to a front pillar and the other end portion of it is connected to one end portion of the lower impact absorption member.

The lower impact absorption member is prolonged in a vertical direction with respect to the ground, and the impact transition member is connected to a lower end portion of the lower impact absorption member.

The side sill is prolonged and formed in the forward and backward directions so as to support the lower inner side of the vehicle door, and the impact transition member is connected to a front end portion of the side sill.

To a rear end portion of the impact transition member is connected a side sill impact absorption member disposed in the inner side of the side sill.

According to a structure for dispersing the collision energy of a front pillar during a car crashes of the present invention, it is possible to prevent an external force from being intensively transferred to the doors of a vehicle by effectively dispersing the collision energy in the directions of the upper side and the lower side of a front pillar, the collision energy being generally transferred from a fender apron when a vehicle crashes into on its front side. Therefore, the injuries of the driver and the passenger can be minimized.

The present methods and apparatuses have other features and advantages apparent from the accompanying drawings, incorporated herein, and below Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
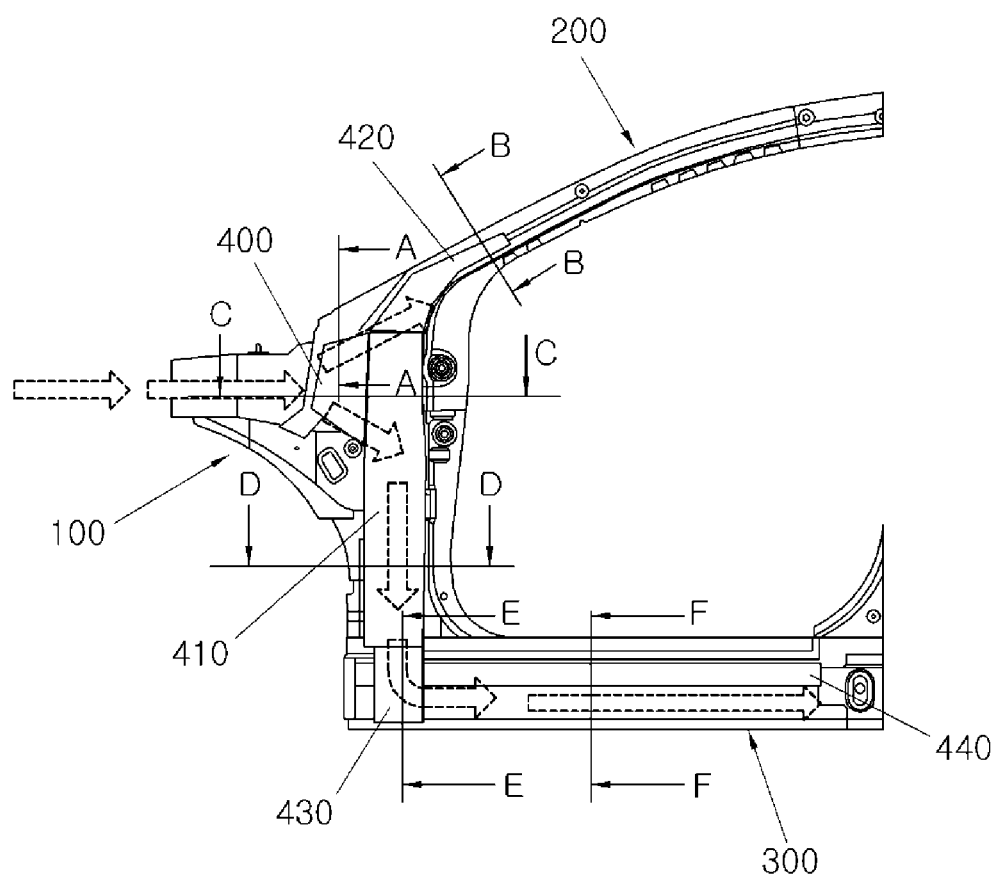
FIG. 1 is a cross sectional view illustrating an exemplary structure for dispersing the collision energy of a front pillar during a car crash according to the present invention.

FIG. 1 is a cross sectional view illustrating a structure for dispersing the collision energy of a front pillar during a car crash according to an embodiment of the present invention. As shown in FIG. 1, the structure for dispersing the collision energy of a front pillar during a car crash according to an embodiment of the present invention includes a front impact absorption member 400 disposed in the interior of a body front frame 100 at the side of a fender apron to which is connected a front end portion of a front pillar 200 of a vehicle, a lower impact absorption member 410 connected to a rear end portion of the front impact absorption member 400, an upper impact absorption member 420 connected to an upper side of the lower impact absorption member 410, an impact transition member 430 connected to a lower side of the lower impact absorption member 410, and a side sill impact absorption member 440 connected to a rear end portion of the impact transition member 430. Here, the body front frame 100 means a frame forming a cowl or a fender apron disposed at a front side of a vehicle. The front impact absorption member 400 is provided in the interior of the body front frame 100 for thereby first absorbing the collision energy transferred from the front side.

Figure 2:
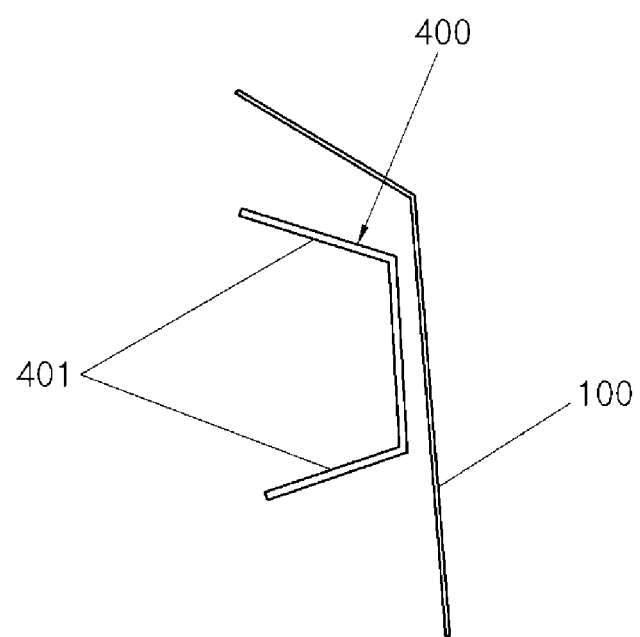
FIG. 2 is a cross sectional view taken along the line A-A of FIG. 1.

FIG. 2 is a cross sectional view taken along the line A-A of FIG. 1. As shown in FIG. 2, the front impact absorption member 400 is disposed with its one side surface contacting with the body front frame 100 so as to more effectively absorb the collision energy. It may be disposed in a shape forming a bent surface 401 of which both sides are bent about one side surface. In addition, the front impact absorption member 400 is formed with its height gradually increasing in the direction from its front end portion to the rear end portion, so the collision energy transferred during the car crash can be reliably transferred to the lower impact absorption member 410.

Figure 3:
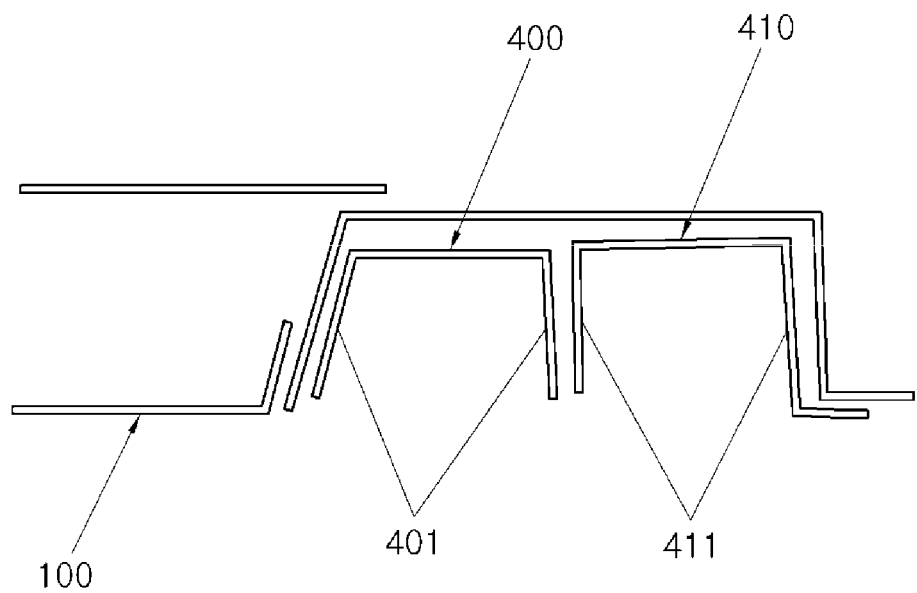
FIG. 3 is a cross sectional view taken along the line C-C of FIG. 1.

FIG. 3 is a cross sectional view taken along the line C-C of FIG. 1. As shown in FIG. 3, the front impact absorption member 400 and the lower impact absorption member 410 respectively define the bent surface 411 of which both side surfaces are bent about one surface. Any one bent surface 401 of the front impact absorption member 400 surface-contacts with any one bent surface 411 of the lower impact absorption member 410, so the collision energy transferred from the front impact absorption member 400 can be stably transferred.

Figure 4:
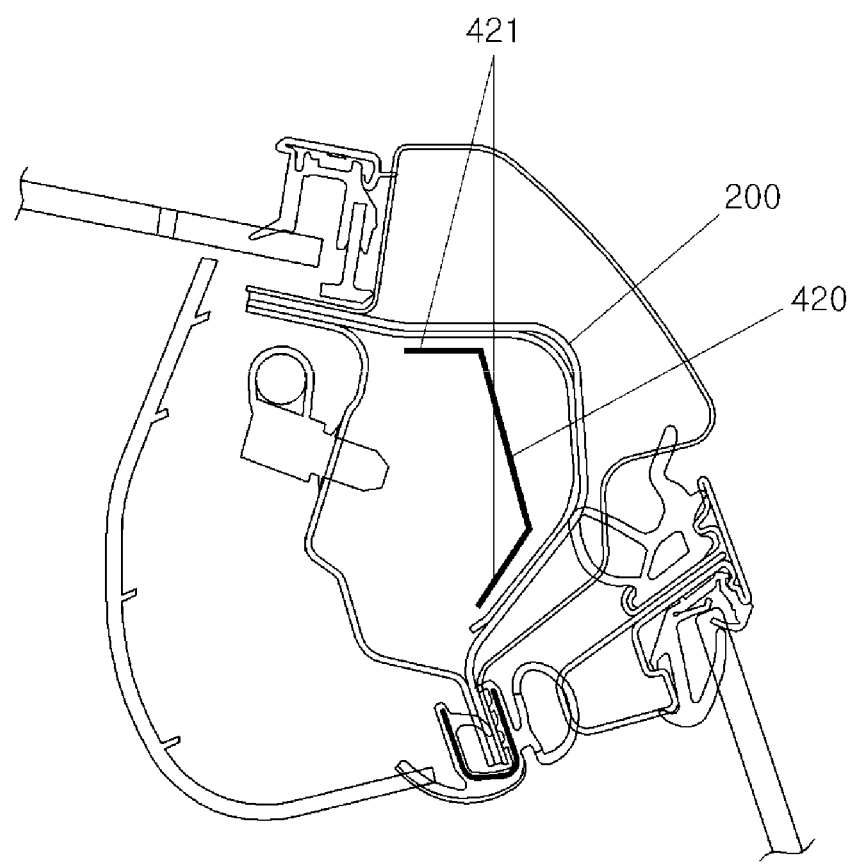
FIG. 4 is a cross sectional view taken along the line B-B of FIG. 1.

FIG. 4 is a cross sectional view taken along the line B-B of FIG. 1. As shown FIG. 4, the upper impact absorption member 420 is arranged along the longitudinal direction of the inner side of the inner frame of the front pillar 200. In addition, the upper impact absorption member 420 defines the bent surface 421 of which both sides are bent about one surface.

Figure 5:
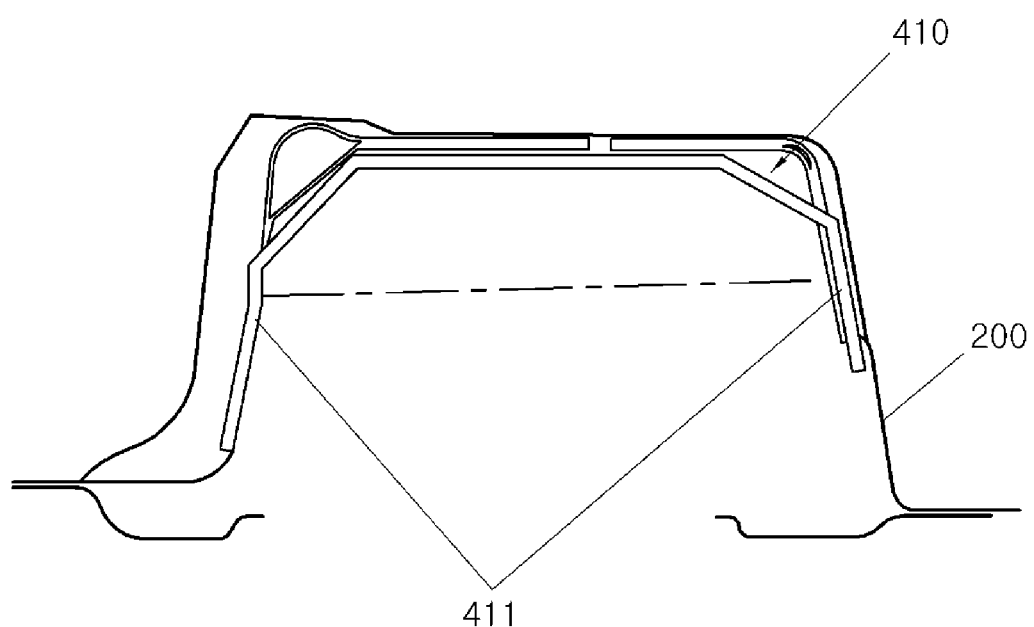
FIG. 5 is a cross sectional view taken along the line D-D of FIG. 1.

FIG. 5 is a cross sectional view taken along the line D-D of FIG. 1. As shown in FIG. 5, the lower impact absorption member 410 is prolonged in an upright shape from the ground, and a bent surface 411 of which both sides are bent about one surface of the lower impact absorption member 410 is formed so that it can surface-contact with the body front frame 200 prolonged from the front side of the vehicle door.

Figure 6:
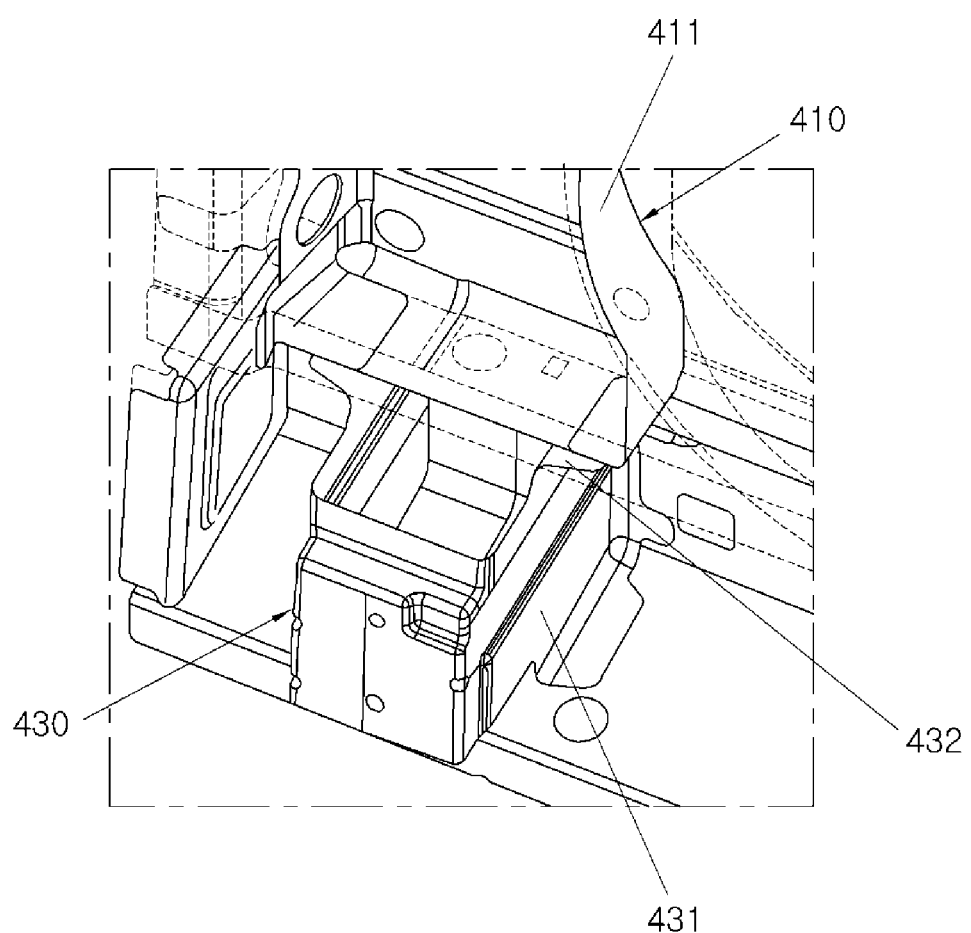
FIG. 6 is a perspective view illustrating a connection part between a lower side impact absorption member and an impact transition member of FIG. 1.
Figure 7:
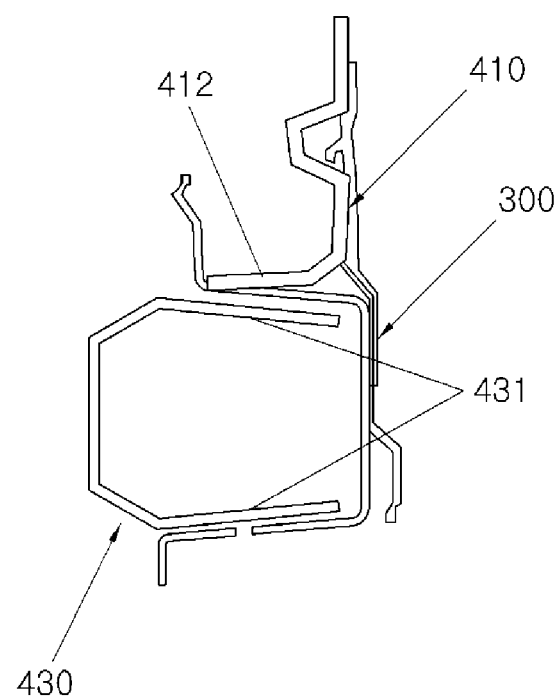
FIG. 7 is a cross sectional view taken along the line E-E of FIG. 1.

FIG. 6 is a perspective view illustrating a connection part between a lower side impact absorption member and an impact transition member of FIG. 1. FIG. 7 is a cross sectional view taken along the line E-E of FIG. 1. As shown in FIGS. 6 and 7, at a lower side of the lower impact absorption member 410 is formed an engaging surface 412 for an engagement with the upper side of the impact transition member 430. The impact transition member 430 has a bent surface 411 of which both sides are bent about one surface, one side in the bent surface 411 surface-contacts with the engaging surface 412. In other words, the collision energy transferred to the lower impact absorption member 410 is transferred to the side sill impact absorption member 440. At this time, the engaging surface 412 and the flange 432 can be engaged by a welding method or a bolting method.

Figure 8:
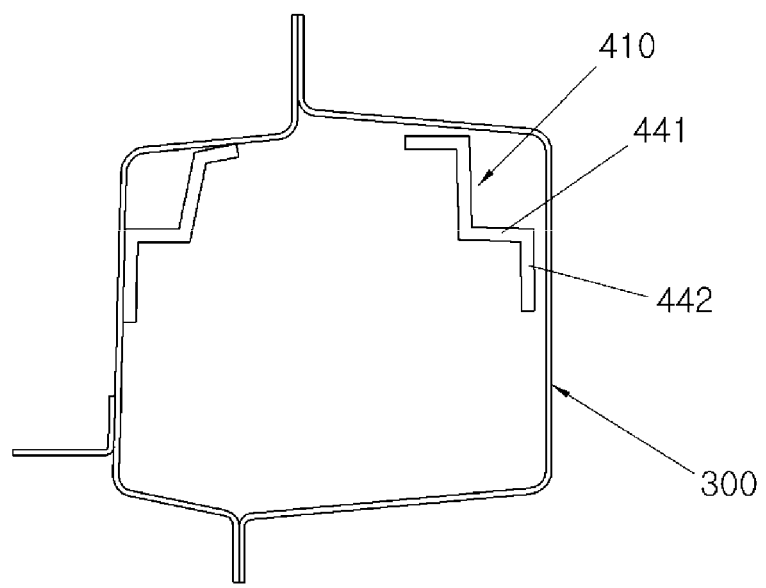
FIG. 8 is a cross sectional view taken along the line F-F of FIG. 1.
Figure 9:
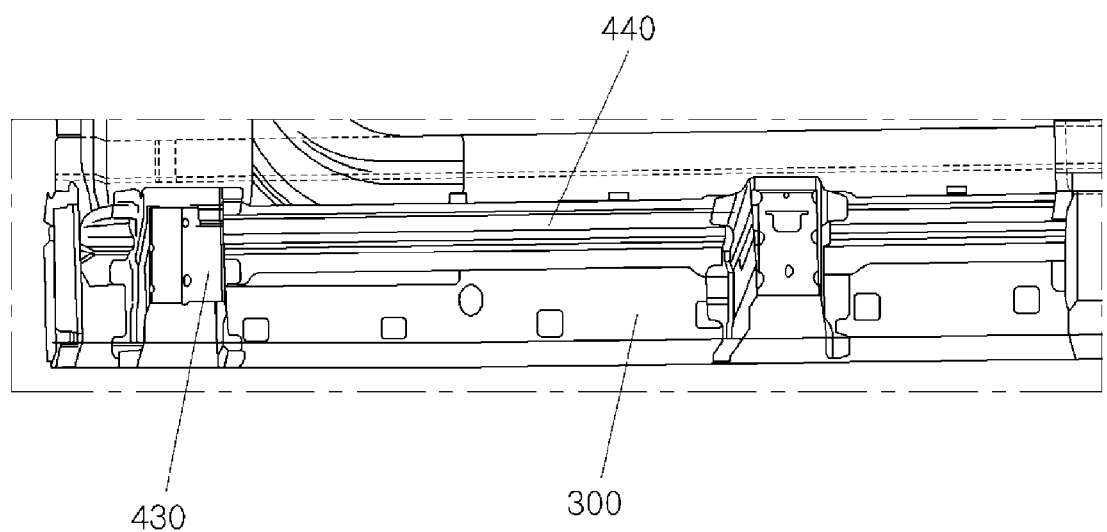
FIG. 9 is a view illustrating the inner side of a side sill of FIG. 1.

FIG. 8 is a cross sectional view taken along the line F-F of FIG. 1, and FIG. 9 is a view illustrating the inner side of the side sill of FIG. 1. As shown in FIGS. 8 and 9, the side sill impact absorption member 440 is arranged in the inner side of the side sill 300 which supports the lower side of the vehicle door in the forward and backward directions. In addition, the cross section of the side sill impact absorption member 440 looks like a bent portion 441 and a vertical surface 442 are continuously formed so that the step shapes are formed in the widthwise direction along the longitudinal direction.

According to the structure for dispersing the collision energy of a front pillar during a car crash according to an embodiment of the present invention, the collision energy occurring due to the front side collision is dispersed and absorbed by means of the front impact absorption member 400, the upper impact absorption member 420, the lower impact absorption member 410, the impact transition member 430 and the side sill impact absorption member 440 after it directly hits the front apron, which is relatively wider, without passing through the front side member even in case of the front side collision of the vehicle or the 25% offset front side collision which is more severe condition than the conventional 40% offset front side collision. Therefore, it is possible to inhibit the over deformation of the vehicle door, and as the deformations of the dash board of the vehicle or the opening part of the vehicle door can be minimized, the deformations of the passenger's rooms of the vehicle can be accordingly reduced, thus minimizing the hurts of the passenger.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure for dispersing a collision energy of a front pillar of a car during a car crash, comprising:
   a front impact absorption member formed in an interior of a front frame of a vehicle and configured to receive the collision energy upon impact with a front side of the car;
   upper and lower impact absorption members configured to disperse the collision energy of the front impact absorption member to the front pillar and a lower side of the front pillar respectively; and an impact transition member connected to a lower side of the lower impact absorption member and connected to a front end portion of a side sill;

wherein each of the front impact absorption member and the lower impact absorption member have a bent surface, each of which have opposing sides bent about one surface and are engaged in such a way that any one of pairs of the bent surfaces of the front impact absorption member and the lower impact absorption member surface-contacts; and wherein one end portion of the upper impact absorption member is connected to the front pillar and an other end portion of it is connected to one end portion of the lower impact absorption member; and wherein the front impact absorption member includes a side surface interposed between a pair of bent surfaces and facing a direction of absorbing vehicular frontal impact.

2. The structure for dispersing the collision energy of the front pillar during the car crash according to claim 1, wherein the front impact absorption member has a trapezoid shape of which a height gradually increases in a direction from a front end portion to a rear end portion.

3. The structure for dispersing the collision energy of the front pillar during the car crash according to claim 1, wherein the lower impact absorption member is prolonged in a vertical direction with respect to the ground, and the impact transition member is connected to a lower end portion of the lower impact absorption member.

4. The structure for dispersing the collision energy of the front pillar during the car crash according to claim 1, wherein the side sill is prolonged and formed in the forward and backward directions so as to support a lower inner side of a vehicle door, and the impact transition member is connected to a front end portion of the side sill.

5. The structure for dispersing the collision energy of the front pillar front pillar during the car crash according to claim 3, wherein to a rear end portion of the impact transition member is connected to a side sill impact absorption member disposed in an inner side of the side sill.

* * * * *